(12) United States Patent
Brandon, II et al.

(10) Patent No.: US 7,816,886 B2
(45) Date of Patent: Oct. 19, 2010

(54) BATTERY CHARGER

(75) Inventors: Michael J. Brandon, II, North Ridgeville, OH (US); Jason M. Barr, Wentzville, MO (US); Peter F. Hoffman, Avon, OH (US); David A. Furth, Skaneateles, NY (US); Rachel P. Devereaux, Ballwin, MO (US); Mandy Iswarienko, Wildwood, MO (US)

(73) Assignee: Eveready Battery Company, Inc., St. Louis, MO (US)

( * ) Notice: Subject to any disclaimer, the term of this patent is extended or adjusted under 35 U.S.C. 154(b) by 620 days.

(21) Appl. No.: 11/370,595

(22) Filed: Mar. 8, 2006

(65) Prior Publication Data

US 2007/0210747 A1    Sep. 13, 2007

(51) Int. Cl.
*H02J 7/00* (2006.01)
(52) U.S. Cl. .................. 320/110; 320/112; 320/113; 320/115
(58) Field of Classification Search ............. 320/107, 320/110, 113, 115, 106, 114; 429/96, 99, 429/100, 175, 177
See application file for complete search history.

(56) References Cited

U.S. PATENT DOCUMENTS

| 366,649 A | 5/1972 | Kaye |
| 4,072,800 A | 2/1978 | Gammer |
| 4,288,733 A | 9/1981 | Bilanceri et al. |
| 4,611,160 A | 9/1986 | Camens |
| 4,629,962 A | 12/1986 | Arakawa |
| 5,028,859 A | 7/1991 | Johnson et al. |
| 5,039,929 A | 8/1991 | Veistroffer et al. |
| 5,280,229 A | 1/1994 | Faude et al. |
| 5,327,067 A | 7/1994 | Scholder |
| 5,686,811 A | 11/1997 | Bushong et al. |
| 5,689,171 A | 11/1997 | Ludewig |
| 5,717,309 A | 2/1998 | Cho |
| 5,742,149 A | 4/1998 | Simpson |
| 5,780,991 A | 7/1998 | Brake et al. |
| 5,926,005 A | 7/1999 | Holcomb et al. |
| 5,955,867 A | 9/1999 | Cummings et al. |
| 5,955,868 A | 9/1999 | Kaite et al. |

(Continued)

FOREIGN PATENT DOCUMENTS

GB    2386006 A    9/2003

OTHER PUBLICATIONS

Energizer, Battery Charger Marketing Material, Jun. 8, 2005.

(Continued)

*Primary Examiner*—Bao Q Vu
*Assistant Examiner*—Nguyen Tran
(74) *Attorney, Agent, or Firm*—Gregory J. Adams

(57) ABSTRACT

A battery charger (100) includes a base (102) which selectively receives first (104*a*) and second (104*b*) battery pods. The battery pods (104*a*, 104*b*), which are adapted to receive one or more batteries (212) for charging, have a form factor which facilitates the handling of the pods (104) and the batteries (212) received therein. Charging energy may be allocated between the pods (104) as a function of the temporal sequence in which the pods (104) are received by the base (102). Charging energy may also be allocated among the batteries (212) so that the batteries (212) are substantially charged at about the same time.

22 Claims, 6 Drawing Sheets

U.S. PATENT DOCUMENTS

| | | |
|---|---|---|
| 5,959,434 A | 9/1999 | Park et al. |
| 5,963,014 A | 10/1999 | Chen |
| 6,104,163 A | 8/2000 | Komatsu et al. |
| 6,124,699 A | 9/2000 | Suzuki et al. |
| 6,194,867 B1 | 2/2001 | Cummings et al. |
| 6,235,420 B1 | 5/2001 | Ng |
| 6,242,888 B1 | 6/2001 | Cerf |
| 6,313,751 B1* | 11/2001 | Whitmire et al. ......... 340/636.1 |
| 6,350,040 B1 | 2/2002 | Parker |
| 6,529,714 B1* | 3/2003 | Nakamura et al. ....... 455/575.1 |
| 6,534,951 B2 | 3/2003 | Kawashima |
| 6,599,657 B1 | 7/2003 | Pollett et al. |
| 6,617,827 B2 | 9/2003 | Knish et al. |
| 6,794,851 B2 | 9/2004 | Murakami et al. |
| 6,816,740 B2 | 11/2004 | Lin |
| 6,825,638 B2 | 11/2004 | Kim |
| 6,847,190 B2 | 1/2005 | Schaefer et al. |
| 6,917,183 B2 | 7/2005 | Barlev et al. |
| 6,995,542 B2 | 2/2006 | Yu et al. |
| 7,189,473 B2* | 3/2007 | Smith et al. .................. 429/82 |
| 7,394,220 B2* | 7/2008 | Huang ........................ 320/112 |
| 2003/0006734 A1* | 1/2003 | You ........................... 320/125 |
| 2004/0046673 A1* | 3/2004 | Kovarik et al. ........... 340/636.1 |
| 2004/0151979 A1* | 8/2004 | Donaldson .................... 429/99 |
| 2004/0214052 A1 | 10/2004 | Rochelo |
| 2005/0112457 A1 | 5/2005 | Breen et al. |
| 2005/0189921 A1 | 9/2005 | Bayne et al. |
| 2006/0097694 A1* | 5/2006 | Nagura ........................ 320/112 |
| 2007/0114967 A1* | 5/2007 | Peng .......................... 320/101 |
| 2007/0216352 A1* | 9/2007 | Shaddle ...................... 320/114 |

OTHER PUBLICATIONS

Minolta EBP 100—battery holder + battery charger—camera battery—Lilon x2, Shop.com, downloaded Feb. 17, 2006, www.shop.com.

Patent Cooperation Treaty (PCT), International Search Report & Written Opinion for Application PCT/US2007/004628 filed Feb. 20, 2007, Mailed Oct. 1, 2007, 12 pgs., European Patent Office, Netherlands.

* cited by examiner

BATTERY CHARGER

BACKGROUND

The present invention relates to battery chargers.

Recent years have seen a proliferation of battery powered electrical devices. Digital cameras, personal digital assistants (PDAs), hand held games, portable audio players, remote control devices, wireless computer keyboards and mice, and mobile telephones are but a few examples of this trend.

Rechargeable (secondary) batteries, such as nickel-metal hydride (NiMH), nickel-cadmium (NiCd), and lithium ion (LiIon) electrical cells, have likewise gained increasing acceptance as a renewable power source for these and other devices. Rechargeable batteries are typically well-suited for use in relatively high-drain devices, making them attractive in a wide variety of applications. As they can be recharged and reused, rechargeable batteries can also provide convenience and cost advantages relative to non-rechargeable (primary) batteries.

One factor which affects the utility of rechargeable batteries and the chargers needed to charge them is increasing mobility. As but one example, business travelers often require the use of a battery powered appliance while on a business trip. As another, a leisure traveler may likewise wish to use a digital camera while on a trip or outing. In either case, the user may wish to have a supply of replacement batteries ready to hand.

Functionality can also be a factor in less mobile situations. For example, a user may wish to charge a number of batteries, whether for immediate use or use at a later time. Once the batteries are removed from the charger, however, the batteries sometimes become misplaced or otherwise disorganized.

Factors such as size, ease of use, and charging time can also influence the decision to use to a particular charger. In situations where a user wishes to charge multiple batches of batteries, it is generally desirable that the batches are charged as quickly as possible, or otherwise in an easily understood and predictable way. It is also desirable that the available charging capacity be used relatively efficiently, and that the charging of the various batteries in a batch be completed at about the same time.

SUMMARY

Aspects of the present invention address these matters, and others.

According to a first aspect of the invention, a battery charger includes a first battery pod and a first charging bay. The first battery pod includes a first battery receiving region adapted to receive a first plurality of generally cylindrical batteries for charging and a first cover. The first cover is moveable to an open position which allows a human user to remove selected ones of the first plurality of batteries from the first battery receiving region for use in a battery powered appliance and a closed position which facilitates handling of the first battery pod. The first battery pod has a form factor which allows the first battery pod to be placed in a human clothes pocket. The first charging bay is adapted to selectively receive the first battery pod for charging the first plurality of batteries.

According to another aspect of the invention, a method is used with a battery charger including a first battery holder and a first charging bay. The first battery holder is adapted to receive a first plurality of batteries for charging and includes a first cover. The method includes inserting a first plurality of batteries in the first battery holder, closing the first cover, placing the first battery holder in the first charging bay, charging the first plurality of batteries, removing the first battery holder from the first charging bay, opening the first cover, and removing a battery from the battery receiving region. The first plurality of batteries includes at least one of AAA, AA, C, and D size batteries;

According to another aspect, a battery charger includes first and second battery holders, a base, and charging circuitry. The first battery holder is adapted to receive a first battery for charging and includes a first cover moveable to a first position which allows a user to remove the first battery from the first battery holder for use in a battery powered appliance and a second position which facilitates handling of the first battery holder. The second battery holder is adapted to receive a second battery for charging and includes a second cover moveable to a first position which allows a user to remove the second battery from the second battery holder and a second position which facilitates handling of the second battery holder. The base includes a first portion adapted to selectively receive the first battery holder and a second portion adapted to selectively receive the second battery holder. The charging circuitry is adapted to charge the first and second batteries when the first and second battery holders are received by the base.

Those skilled in the art will recognize still other aspects of the present invention upon reading and understanding the attached description.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
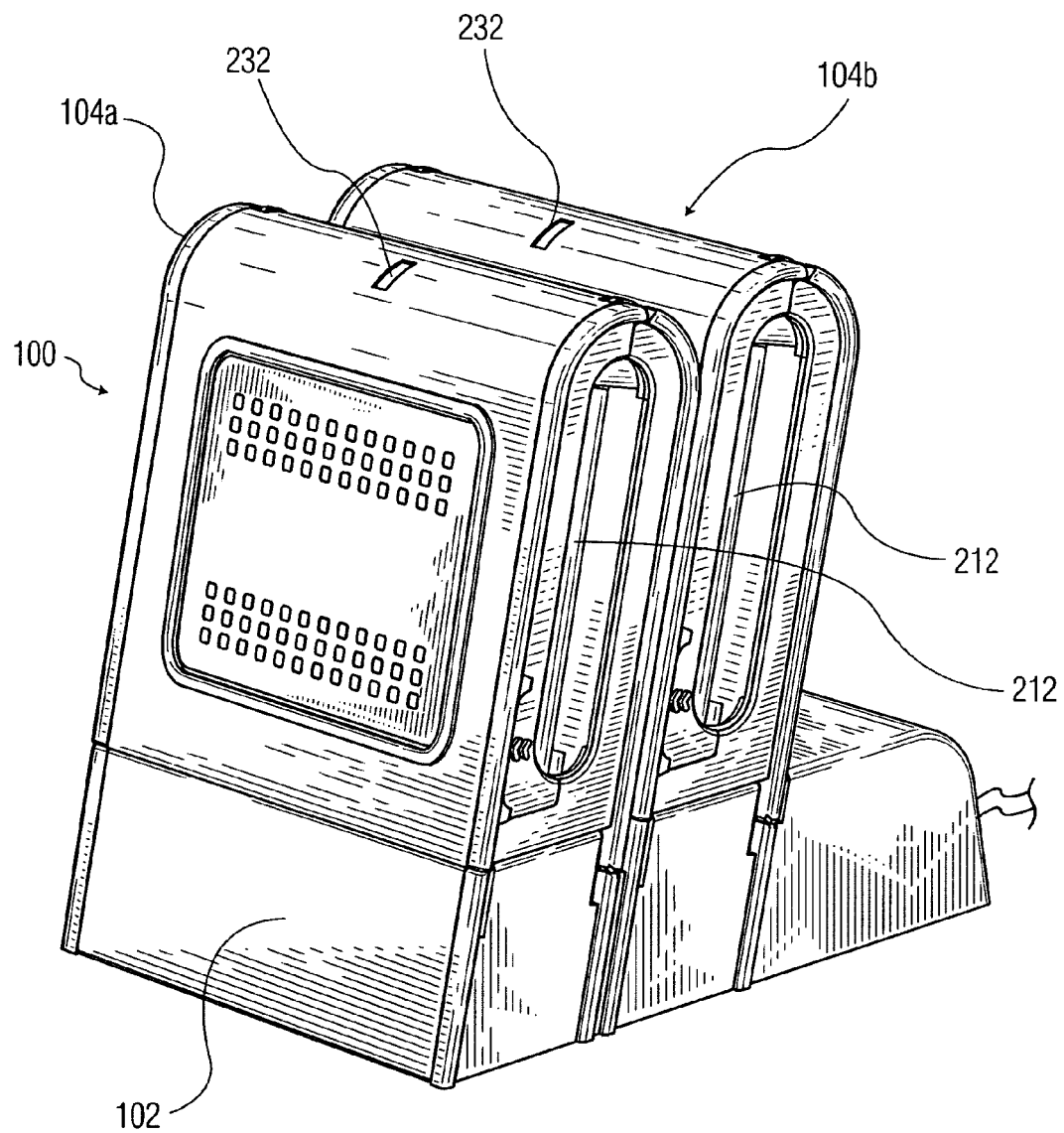
FIG. 1 is a perspective view of a battery charger.
Figure 2:
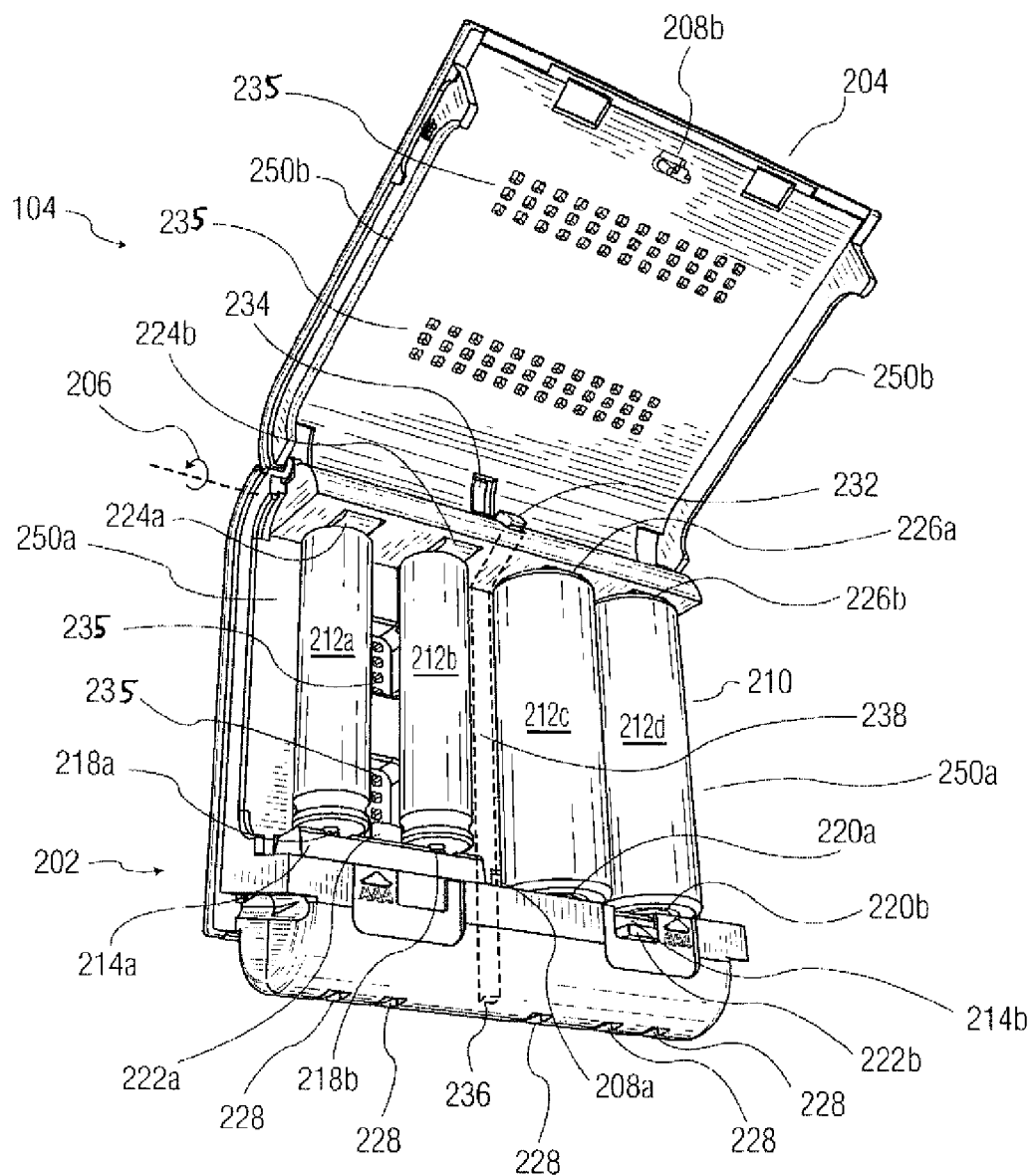
FIG. 2 is a perspective view of a battery pod.

With reference to FIG. 1, a battery charger 100 includes a base 102 and first 104a and second 104b battery holders or pods. The pods 104a, 104b are adapted to be selectively received by the base 102 and preferably have external dimensions which facilitate handling and/or transport by a typical consumer. As illustrated in FIGS. 1 and 2, for example, the pods 104a, 104b have a length of 77 millimeters (mm), a width of 71 mm, and a depth or thickness of 22 mm. At least a portion of the pods 104 is preferably visible during charging. As shown in FIG. 1, and depending on a user's perspective, substantially all of the front surface of the first pod 104a, the tops and sides of first 104a and second 104b pods, and the rear surface of the second pod 104b can be seen.

Turning now to FIG. 2, the pods 104 include a body 202 and a cover 204 which, in the illustrated embodiment, is hingedly attached to the body 202 for rotation about a hinge axis 206. The cover 204 is moveable in a generally clamshell fashion between an open position (as shown) which allows a user to selectively insert and/or remove batteries and a closed position which facilitates handling and/or transport of the pod 104 and any batteries inserted therein. The body 202 and cover 204 include corresponding latch or tab portions 208a, 208b which provide sufficient closing force to hold the cover 204 in the closed position during normal handling of the pod 104 but allow a user to easily open and/or close the cover 204 as desired.

As illustrated in FIG. 2, the pod 104 includes a battery receiving region 210 adapted to receive one or more batteries 212a, 212b, 212c, 212d. First 214a and second 214b contact supports carry respective battery contacts 218a, 218b and 220a, 220b. The contact supports 214 are preferably mounted for pivotal motion with respect to the battery receiving region 210 so that the user may configure the pod 104 to accept batteries of different sizes. As illustrated, the first contact support 214a is disposed in a first position which accepts relatively shorter (e.g., AAA size) batteries; the second contact support 214b is disposed in a second position which accepts relatively longer (e.g., AA size) batteries. Tabs 222a, 222b are preferably provided to assist the user in pivoting the contact supports 214a, 214b to their desired positions. Spaced apart from the first set of battery contacts 218a, 218b, 220a, 220b is a corresponding second set of battery contacts 224a, 224b, 226a, 226b.

Electrical connections to the base 102 are provided through pod electrical contacts 228 located at a bottom portion of the pod. To facilitate handling of the pod 104 and to reduce the likelihood of damaging or shorting the pod electrical contacts 228, the contacts 228 may be slightly recessed in or substantially flush with the lower surface of the body 202. Electrical protection devices such as a positive temperature coefficient (PTC) resistive devices or diodes may also be provided to protect against short circuits or to allow charging but not discharging of the batteries 212 through the pod electrical contacts 228.

A light pipe 238 (shown in phantom) is disposed in the body 202. A first end 236 of the light pipe terminates at a rear portion of the lower surface of the body 202 so that the light pipe is in optical communication with the exterior of the body 202. The second end forms a human readable status indicator 232, which aligns with a corresponding opening 234 in the cover 204 so that the status indicator 232 is visible when the cover 204 is closed. To facilitate handling of the pod 104 and to reduce the likelihood of damaging the first end 236 of the light pipe 238, the first end 236 may be slightly recessed in or substantially flush with the lower surface of the body 202.

Vents 235 located in the cover 204 and body 202, respectively, provide ventilation of the batteries 212 during charging. Additional vents are formed by cutouts 250a, 250b in the sides of the body 202 and cover 204, respectively.

Figure 3:
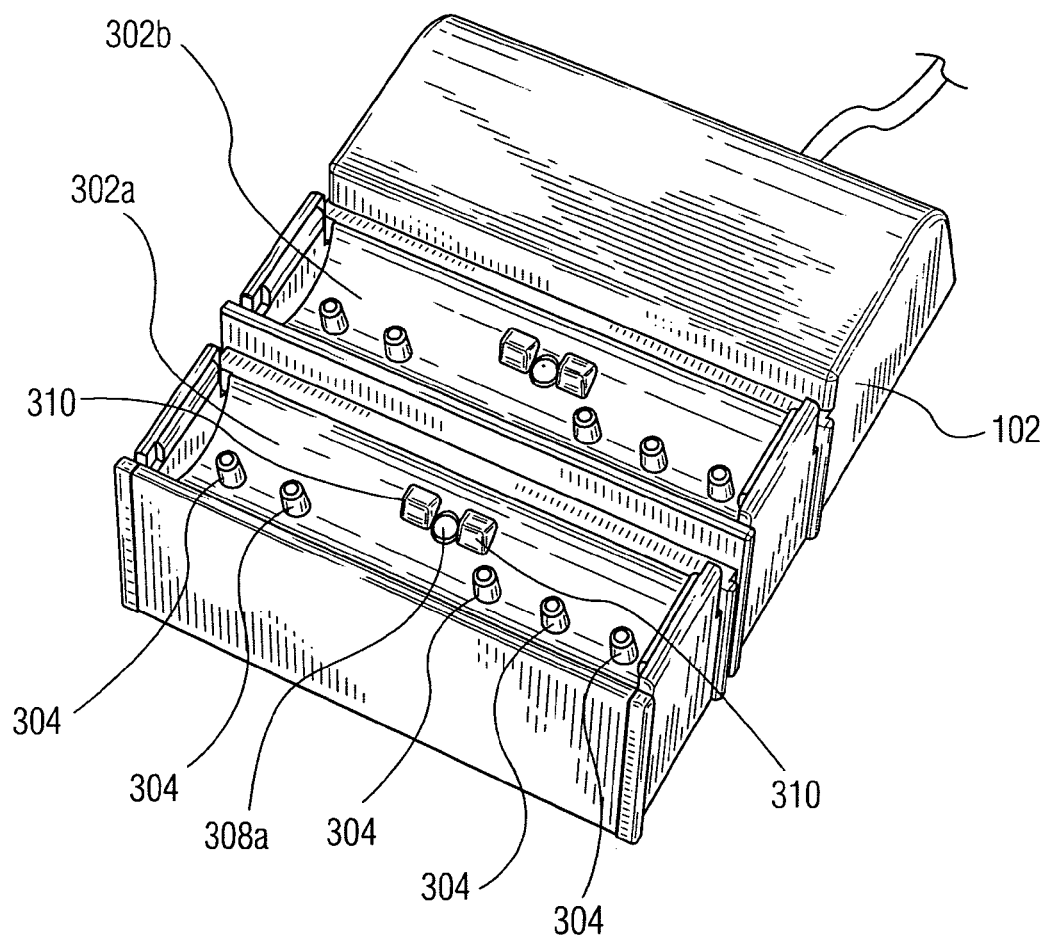
FIG. 3 is a perspective view of a base.

Turning now to FIG. 3, the base 102 includes first 302a and second 302b bays which are adapted to receive the pods 104a, 104b for charging the batteries disposed therein. The first bay 302a includes bay electrical contacts 304 which correspond to the pod electrical contacts 228. The first bay 302a also includes a multicolor red/green/amber light emitting diode (LED) 308 in optical communication with the end 236 of the light pipe. Mechanical protrusions or keys 310, which correspond to recesses in the rear bottom surface of the body 202, prevent the pod 104 from being inserted in the bay 302a in the incorrect orientation. The construction of the second bay 302b is substantially the same as that of the first bay 302a so that the pods 104a, 104b may be placed interchangeably in either bay 302a, 302b.

The housing 102 also houses battery charging circuitry which supplies electrical energy to the bays 302a, 302b and thus the batteries 212 received in the respective pods 104. The battery charging circuitry, which advantageously receives power from a wall cube connected to the alternating current (AC) power mains, is electrically connected to the electrical contacts 304 and to the LEDs 308 of the bays 302a, 302b.

With references to FIGS. 1, 2 and 3, the bays 302 and pods 104 are advantageously configured so that the pods 104 are received in and removed from the bays 302 in a direction which is substantially collinear with the longitudinal axes of the batteries 212. Also illustrated, the cover 204 is arranged so that the batteries 212 are inserted in and removed from the pods 104 in a direction which is substantially perpendicular to the longitudinal axes of the batteries 212. Moreover, the bays 302 are arranged so that the rear surface of the first pod 104a and the front surface of the second pod 104b are disposed parallel substantially adjacent to one other. Although other physical arrangements are contemplated, one advantage of such an arrangement is that the physical footprint of the base 102 may be reduced, while also allowing easy access to the pods 104 and the batteries 212 received therein.

As will be appreciated by those skilled in the art, various battery charger circuit topologies are well known and are ordinarily selected based on the chemistry or other characteristics of the batteries being charged, economic factors, and the like. As one example, NiMH or NiCD batteries are sometimes charged at a relatively constant charging current which is established as a function of the energy capacity of the batteries to be charged. Charging is often controlled based on the rate of change of the battery voltage or using a timer based circuit, either alone or in combination. As another, LiIon batteries are sometimes charged at a relatively high, substantially constant current level when relatively discharged, with the current generally decreasing as the battery becomes more fully charged.

Figure 4:
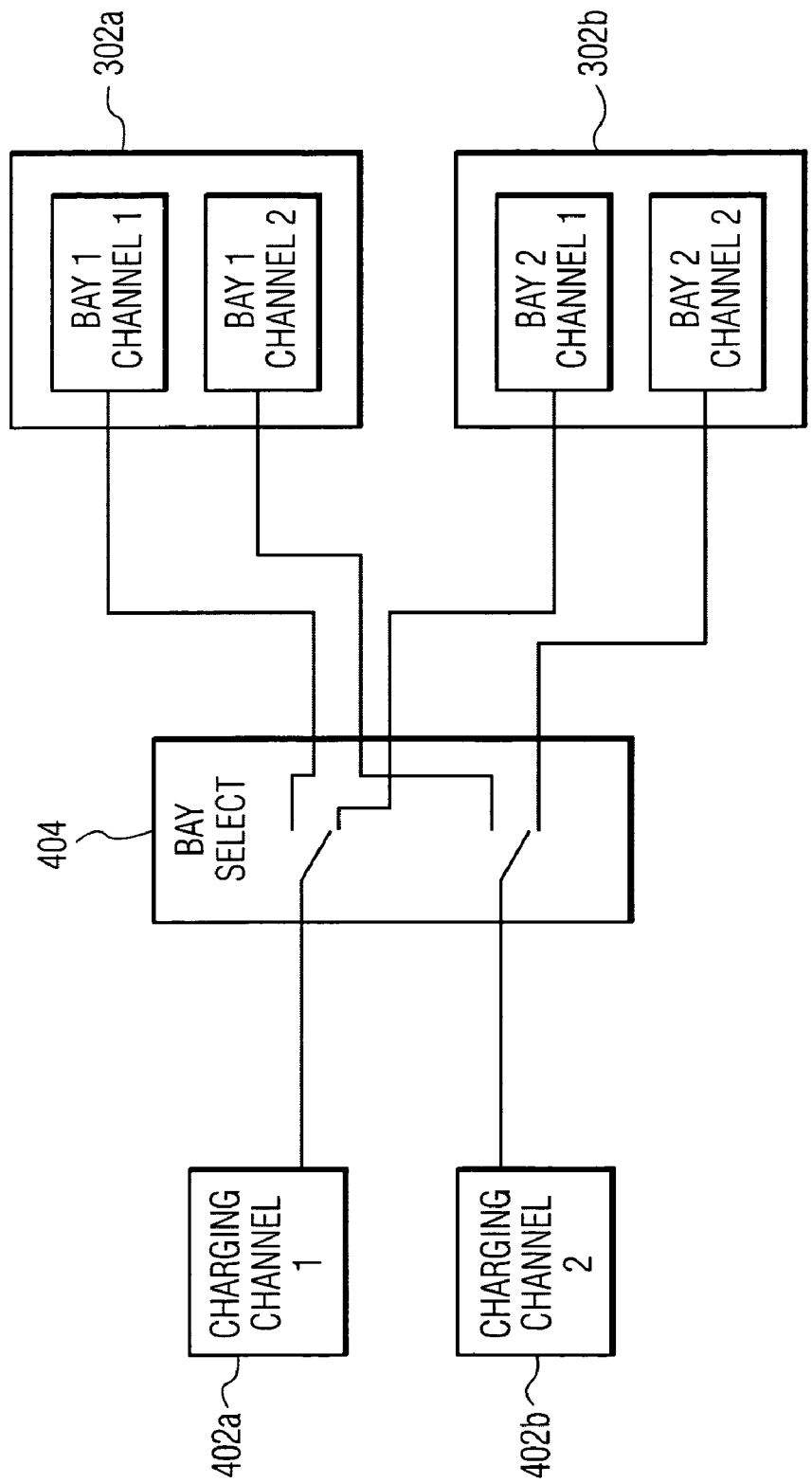
FIG. 4 is a functional block diagram of a charging circuit.

Nonetheless, and as illustrated in FIG. 4, it remains desirable to allocate the available charging energy among the bays 302a, 302b and the batteries 212 being charged. As can be seen, the charging circuitry includes first 402a and second 402b battery charging channels and bay select circuitry 404. The bay select circuitry 404 applies the electrical energy from the charging channels 402a, 402b to the charging bays 302a, 302b on a first in, first out (FIFO) basis as a function of the temporal sequence in which the pods 104 are inserted in the bays 302a, 302b.

Accordingly, the first bay 302 to receive a pod 104 is designated as the primary bay; the second bay 302 to receive a pod 104 is designated as the secondary bay. Charging energy is preferentially applied to the primary bay 302. This may be accomplished, for example, by applying all or substantially all of the charging energy to the primary bay 302 until charging of the pod 104 placed therein has been substantially completed. When the pod 104 placed in the primary bay 302 is substantially charged or is otherwise removed from the bay 302, the secondary bay 302 becomes the primary bay 302, and all or substantially all of the charging energy is applied thereto. If, while charging a first pod, a second pod 104 is inserted in an unoccupied bay, the unoccupied bay is treated as the secondary bay. If a pod 104 is inserted in the unoccupied bay after charging of the first pod 104 has been substantially completed, the previously unoccupied bay is treated as the primary bay.

Thus, charging energy is preferentially applied to the first pod 104 to be inserted in one of the bays 302a, 302b. If a second pod 104 is subsequently installed in the unoccupied bay 302a, 302b, the second pod 104 is placed in the queue for charging. Once the first pod 104 has been charged, the charging energy is applied to the second pod 104. Removing and then reinserting the first pod 104, for example following the installation of different batteries 212, would cause the first pod 104 to be placed in the queue for charging. In either case, a substantially charged pod 104 may also be trickle charged, even during charging of another pod 104.

In addition, the charging circuitry preferably applies the charging energy to batteries installed in a pod 104 through two more charging channels or circuits 402a, 402b. In the embodiment illustrated in FIG. 2, a first channel 402a is used to charge the first 212a and second 212b batteries; a second channel is used to charge the third 212c and fourth 212d batteries. The first and second charging channels 402a, 402b apply charging energy at charging rates which are selected so that the charging of the batteries 212 installed in a given pod 104 can be expected to be completed at approximately the same time.

Thus, the charging energy may be applied as a function of the energy storage capacity of the batteries 212 connected to the channels 402a, 402b. As illustrated in FIG. 2, the first 212a and second 212b batteries are AAA size batteries, whereas the third 212c and fourth 212d batteries are AA size batteries. Conventional AA and AAA-size NiMH rechargeable batteries typically have an energy storage capacity of about 2650 milliampere hours (mAH) and 1000 mAH, respectively. In the illustrated situation, the first charging channel 402a would apply charging energy to the first 212a and second 212b batteries at a first rate; the second channel 402b would apply charging energy to the third 212c and fourth 212d batteries at a second, relatively higher rate. Where the objective is to ensure that substantially discharged batteries would be charged in approximately three (3) hours, for example, the first charging channel 402a would supply each battery 212a, 212b with a charging current of approximately 400 milliamperes (mA), whereas the second charging channel 402b would supply each battery 212c, 212d with a charging current of approximately 1.08 amperes (A). As will be appreciated, such an arrangement can in many cases be expected to improve both the utility of the charger and the efficiency of the charging process.

It may also be desirable to adjust the charging rate as a function of the measured charge state of the battery or batteries connected to a given channel 402a, 402b. In one implementation, a channel containing a battery or batteries which are relatively more discharged would be charged at a relatively higher rate. In an exemplary situation in which the first 402a and second 402b channels are each connected to a respective battery having the same or similar energy storage capacities, the channel 402 connected to the relatively more discharged battery would be charged at a relatively faster rate. Such an arrangement can further facilitate the selection of charging rates which cause the charging of batteries 212 installed in a given pod 104 to be completed at about the same time.

Moreover, the charging energy may be allocated among the various pods 104 as a function of the battery or batteries received therein so as to more fully utilize the available charging capacity of the charger. By way of example in relation to the pods 104 of FIG. 2, a first pod 104a containing four (4) AAA cells may be received in the primary bay 302, and a second pod 104b containing AA cells may be received in the secondary bay 302. In such a case, excess capacity which is not supplied to the first pod 104a may be used to charge the second pod 104b, albeit at a reduced rate, during the charging of the primary bay. Once the primary bay is substantially charged, the secondary bay becomes the primary bay as described above. In charger topologies where the energy supplied to the primary bay is reduced as the batteries being charged thereby become increasingly charged, the excess capacity may also be provided to the secondary bay during charging of the primary bay.

Figure 5:
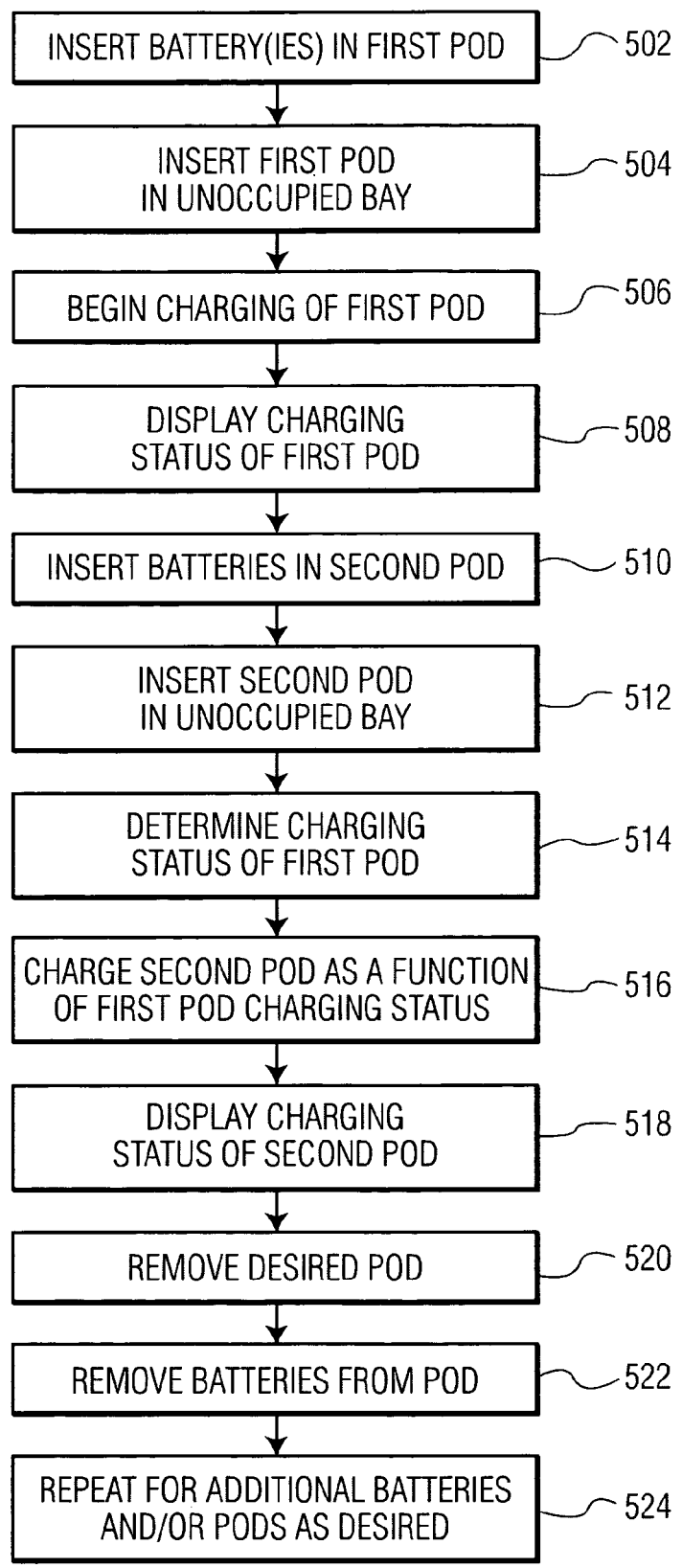
FIG. 5 depicts a method for charging batteries.

In operation, and with reference to FIG. 5, the user opens the cover 204 and inserts the desired battery or batteries 212 in a first pod 104a at step 502. In the embodiment of FIG. 2, for example, the user may insert up to four (4) AA or AAA size batteries. As shown, the battery sizes may selected in groups of (2), depending on the positions of the contact supports 214a, 214b.

At step 504, the user closes the cover 202 and inserts the first pod 104a in an unoccupied bay 302. As the pods 104 and bays 302 are preferably interchangeable, and assuming that both bays 302a, 302b are unoccupied, the first pod 104a may be inserted in either bay 302.

At step 506, the charging circuitry detects the presence of the first pod 104a in the selected bay, determines the type or types of batteries 212 installed therein, and begins the charging process. As described above, for example, the charging circuitry provides charging current at a rate which would be expected to charge the batteries in about three (3) hours.

The charging status of the first pod 104a is displayed on its human readable indicator 232 at step 508. More particularly, optical energy from the LED 308 is received by the light pipe and transmitted to the status indicator 232. Where the first pod 104a is the first pod to be inserted in the base 102, the status indicator 232 would ordinarily display as solid red to indicate that the batteries 212 are being charged, with the color changing to green when charging is complete. An error condition would be displayed as a blinking red signal.

At step 510, the user opens the cover 204 and inserts the desired battery or batteries in a second pod 104b.

At step 512, the user inserts the second pod 104b in an unoccupied bay 302.

At step 514, the charge control circuitry detects the presence of the second pod 104a in the selected bay 302 and determines the charging status of the first pod 104a.

At step 516, the charging circuitry charges the second pod 104b as a function of the first pod 104a charging status. Where the second pod 104b is inserted shortly after the first pod 104a, the first pod 104a would ordinarily be expected to be being charged. Accordingly, the second pod 104b would be placed in the queue for charging. If the first pod 104a is in error condition, or if charging of the first pod 104a has been or subsequently completed, the charging circuitry determines the type or types of batteries 212 installed in the second pod 104b and begins the charging process.

At step 518, the charging status of the second pod 104a is displayed on its human readable status indicator. When the second pod 104b is in the queue for charging, its status indicator 232 would ordinarily display as solid yellow, with the color changing to red to indicate that its batteries 212 are being charged, and to green when charging is complete.

At step 520, the user removes the desired pod 104 from its respective bay. In such a case, the charging circuitry notes the absence of the pod and adjusts the charging status of the remaining pod as appropriate. Thus, for example, if the removed pod was in the process of being charged and the remaining pod was in the queue for charging, the remaining pod is changed to the charging state. In any case, the user may then handle and/or transport the pod as desired. In the embodiment illustrated in FIG. 2, the form factor of the pod 104 facilitates transport by the user of the pod 104 and any batteries 212 installed therein, for example in a shirt or other pocket, in a briefcase, book bag, camera bag, fanny pack, or the like. The pod 104 and its batteries 212 may also be placed in a drawer or other desired location for use at a later time.

At step 522, the user opens the cover 204 and removes one or more of the desired battery or batteries 212 from the pod 104, for example to place them in a desired battery powered appliance. Again, the form factor and operation of the cover 204 is preferably established so as to facilitate the ready removal of the desired batteries 212.

At step 524, the process is repeated as desired for additional batteries 212 and/or pods 104. For example, the user may elect to insert additional batteries in the previously removed pod as described above at step 510. As another, the user may elect to remove the remaining pod from the charger as described above at 520.

Other variations are possible. For example, the base 102 may include only a single bay 302, in which case the bay select circuitry 404 may be omitted. The base may also include three or more bays, in which case the additional bays may advantageously be treated as tertiary bays. To further reduce the size of the base 102, one or more the bays 302 may configured so to telescope, flip closed, or otherwise collapse when not in use. The base 102 may also be configured to be suspended from a horizontal surface, mounted on a wall, or placed in another desired position or location. The base 102 may also be provided with human readable indicators such as one or more LEDs, an alphanumeric liquid crystal display (LCD), or the like which provides additional information as to the operation and status of the charger 100 and/or the pods 104. The base 102 may also be provided with an operator input such as keys or switches which allow the user to further control the operation of the device.

The pods 104 may likewise receive batteries having different or additional sizes. Thus, the pods 104 may be configured to accept AAA, AA, C, and D size batteries, a desired subset of these sizes (e.g., both C and D size batteries, AA, AAA, and C size batteries, or the like), or batteries of only a single size (e.g., AAA, AA, C, or D size batteries). The first pod 104a may also be configured to accept batteries of a first size or sizes, whereas the second pod 104b may be configured to accept batteries of a second size or sizes. Again, however, the pods 104 are advantageously configured to be received in either of the bays 302. In one example, the first pod 104a would be configured to accept AA and AAA size batteries, while the second pod 104b would be configured to accept C size batteries. One advantage of such an arrangement is that the user may be provided with or otherwise obtain pods 104 which meet the user's existing or evolving needs.

Various mechanical and electrical connection arrangements may be implemented depending on the size or sizes of the batteries to be received in a pod 104. As shown in the non-limiting example of FIG. 2, batteries 212 having more than one size may be selectively received in the same space, and may share a common set of battery electrical contacts. Where batteries 212 of various sizes share a common set of contacts, the battery size may be determined using a switch actuated by the pivot members 218 and read by the charging circuitry. The battery size may also be determined through a user operated switch disposed on the pod 104 or base 102. In another implementation, batteries of different sizes may be received in different physical spaces, or separate battery electrical contacts may otherwise be provided for the different size batteries. In such a case, the energy supplied by the charging electronics may be established as a function of the contacts to which a particular charging channel is connected, or otherwise by detecting the presence of the various batteries. In still another implementation, the charging electronics may determine the battery energy storage capacity or other characteristics of the batteries by measuring one or more pertinent electrical characteristics of the battery. Of course, still other variations are possible.

The pods may also be configured to receive non-cylindrical batteries, for example prismatic batteries, battery packs, or the like. The charger 100 may also be configured so that each pod 104 contains only a single charging channel 402. As yet another alternative, a separate charging channel 402 may be provided for each battery 212 received in a pod 104.

Figure 6:
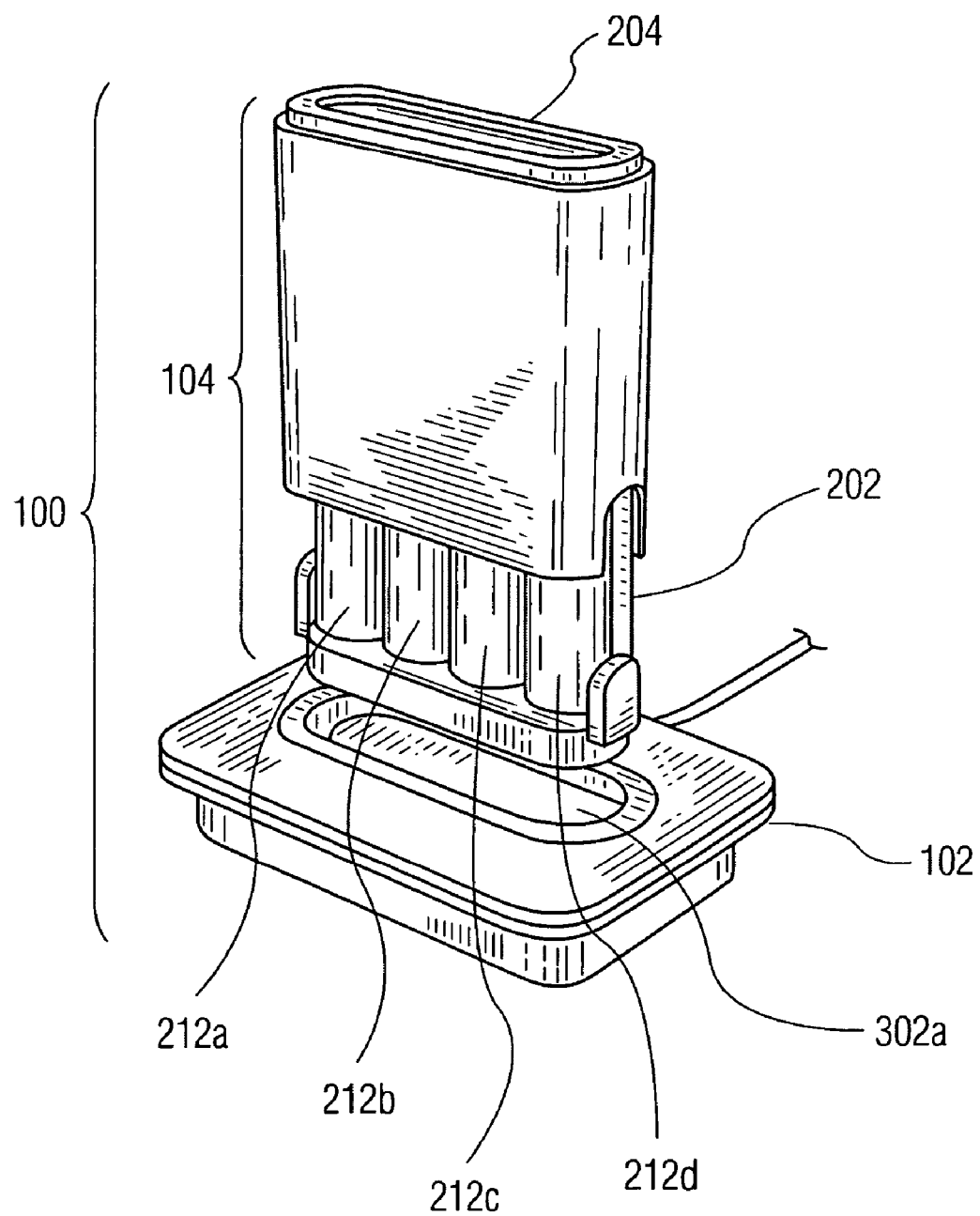
FIG. 6 is a perspective view of a battery pod.

For example, FIG. 6 illustrates a charger 100 in which the base 102 includes only a single bay 302a. Also as illustrated in FIG. 6, the pod 104 accepts four (4) batteries of a single size, and the cover 204 slidingly engages the body 202.

Where the base includes more than one bay 302, the pods 104 may be charged in other than a FIFO basis. Accordingly, the available charging energy may be allocated among two or more pods 104, for example so that the charging of the various pods 104 would ordinarily be expected to be completed in a similar time frame. The charging priority of the various bays 302 and pods 104 may also be user selectable, for example through a user operated switch located on the base 102.

In still another implementation, the pods 104 may include an electrically powered appliance such as a flashlight having an LED or other light source and a corresponding user operable switch. In such a case, the electrically powered appliance is advantageously powered by a LiIon coin cell or other power source separate from the batteries 212 so that the appliance remains functional when the batteries 212 are removed from the pod 104 for use in an external device.

As yet another implementation, the energy transfer between the base 102 and pods 104 may be accomplished through inductive or capacitive coupling. Such an arrangement avoids the necessity for physical electrical contacts. The charger 100 or the pods 104 may also be powered by a source other than the AC power mains, for example through a USB port, other batteries, a mechanical energy source, or solar cells.

Where the pod 104 is provided with a USB or other suitable connector, either the pod 104 or a remote charging device may include suitable battery charging circuitry so that the batteries 212 may be charged from the USB port of an external device or other external source when the pod 104 is remote from the base 102. The pod 104 may also be used to provide electrical energy for charging still other rechargeable batteries disposed in an external battery powered appliance.

FIG. 6 illustrates a charger 100 in which the base 102 includes only a single bay 302a. Also as illustrated in FIG. 6, the pod 104 accepts four (4) batteries of a single size, and the cover 204 slidingly engages the body 202.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A battery charger comprising:
    a first battery pod for holding batteries for transport and charging, said first battery pod comprising:
        a first body configured to be transported by a consumer and received by a charging bay;
        a first battery receiving region defined within the body and configured to receive a first plurality of batteries including at least one of AAA, AA, C and D sized batteries; and
        a first cover attached to the first body and moveable to an open position and a closed position, wherein the first plurality of batteries may be removed from the first battery pod with the cover in the open position and installed in an external device for powering of the external device; and a first charging bay to receive the first battery pod and to provide first charging energy to the first battery pod to charge the first plurality of batteries.

2. The battery charger of claim 1 including:
a second battery pod for holding batteries for transport and charging, said second battery pod comprising:
  a second body configured to be transported by a consumer and received by a charging bay;
  a second battery receiving region and configured to receive a second plurality of batteries including at least one of AAA, AA, C and D sized batteries; and
  a second cover attached to the second body and moveable to an open position for insertion and removal and a closed position, wherein the second plurality of batteries may be removed from the second battery pod with the cover in the open position and installed in an external device for powering of the external device; and
a second charging bay to receive the second battery pod and to provide second charging energy to the second battery pod to charge the second plurality of batteries.

3. The battery charger of claim 2 wherein the first and second charging bays are adapted to receive either of the first and second battery pods.

4. The battery charger of claim 3 electrical charging energy is supplied to the first and second charging bays on a first in first out basis.

5. The battery charger of claim 2 wherein the first charging energy provided to the first battery pod and the second charging energy provided to the second battery pod are based on batteries received in the first and second battery pods.

6. The battery charger of claim 1 wherein the battery charger includes a first charging channel and a second charging channel.

7. The battery charger of claim 6 wherein a first charging rate of the first charging channel is selected as a function of an energy storage capacity of a first battery and a second charging rate of the second charging channel is selected as a function of an energy storage capacity of a second battery.

8. The battery charger of claim 6 wherein a first charging rate of the first charging channel is selected as a function of a charge state of a first battery.

9. The battery charger of claim 1 wherein the first pod includes a charging status indictor.

10. The battery charger of claim 9 wherein the charging status indicator is in optical communication with a light pipe, and wherein the light pipe is adapted to receive an optical signal from a light source external to the pod.

11. The battery charger of claim 1 wherein the first battery pod includes a first major surface and wherein the first major surface is substantially visible while a plurality of batteries are being charged.

12. The battery charger of claim 1, further comprising a first charging channel and a second charging channel.

13. The battery charger of claim 2, wherein the first battery pod includes a first battery and a second battery in the battery receiving region and the first charging channel is connected to the first battery and the second charging channel is connected to the second battery.

14. The battery charger of claim 1, wherein the first cover includes vents.

15. The battery charger of claim 1, wherein the first body includes a latch portion and the first cover includes a tab portion that corresponds to the latch portion.

16. The battery charger of claim 15, wherein the latch portion and the tab portion hold the first cover to the first body in the closed position.

17. The battery charger of claim 1, wherein the first body includes first contacts that correspond to a first charging channel and second contacts that correspond to a second charging channel.

18. The battery charger of claim 17, further comprising a first battery coupled to the first charging channel and a second battery coupled to the second charging channel.

19. The battery charger of claim 18, wherein the first battery is AAA size and the second battery is AA size.

20. The battery charger of claim 2, wherein the first charging energy is greater than the second charging energy.

21. The battery charger of claim 2, further comprising a first charging channel and bay select circuitry that selectively applies the first charging channel to only one of the first and second charging bays.

22. A battery charger comprising:
a first battery holder for holding batteries for transport and charging, said first battery holder comprising:
  a first body configured to be transported by a consumer and received in a charging bay;
  a first battery receiving region defined within the body and configured to receive a first plurality of batteries including at least one of AAA, AA, C and D sized batteries; and
  a first cover attached to the first body and moveable to an open position and a closed position, wherein the first plurality of batteries may be removed from the first battery pod with the cover in the open position and installed in an external device for powering of the external device; and
a first charging bay to receive the first battery pod and to provide first charging energy to the first battery pod to charge the first plurality of batteries.

* * * * *